(12) United States Patent
Kim et al.

(10) Patent No.: US 8,190,606 B2
(45) Date of Patent: May 29, 2012

(54) SYSTEM FOR PROVIDING LYRICS FOR DIGITAL AUDIO FILES

(75) Inventors: Myung Gu Kim, Seoul (KR); Seung Keun Lee, Incheon-si (KR)

(73) Assignees: Taylor Technologies Co., Ltd., Zwinjnaarde (BE); Seung Keun Lee (KR)

( * ) Notice: Subject to any disclaimer, the term of this patent is extended or adjusted under 35 U.S.C. 154(b) by 620 days.

(21) Appl. No.: 10/580,360

(22) PCT Filed: Nov. 24, 2004

(86) PCT No.: PCT/KR2004/003056
§ 371 (c)(1),
(2), (4) Date: Mar. 12, 2007

(87) PCT Pub. No.: WO2005/050888
PCT Pub. Date: Jun. 2, 2005

(65) Prior Publication Data
US 2007/0282844 A1    Dec. 6, 2007

(30) Foreign Application Priority Data
Nov. 24, 2003    (KR) .................. 10-2003-0083570

(51) Int. Cl.
*G06F 17/30* (2006.01)
(52) U.S. Cl. ...................... 707/736; 707/916
(58) Field of Classification Search .......... None
See application file for complete search history.

(56) References Cited

U.S. PATENT DOCUMENTS

| | | | |
|---|---|---|---|
| 2001/0031066 A1* | 10/2001 | Meyer et al. | 382/100 |
| 2002/0173968 A1* | 11/2002 | Parry | 704/500 |
| 2003/0021441 A1 | 1/2003 | Levy et al. | |
| 2003/0158737 A1* | 8/2003 | Csicsatka | 704/273 |
| 2003/0163823 A1* | 8/2003 | Logan et al. | 725/89 |
| 2004/0019608 A1* | 1/2004 | Obrador | 707/104.1 |
| 2004/0060070 A1* | 3/2004 | Mizushima | 725/110 |
| 2004/0266337 A1* | 12/2004 | Radcliffe et al. | 455/3.06 |

FOREIGN PATENT DOCUMENTS

| | | |
|---|---|---|
| WO | 0054187 | 9/2000 |
| WO | 0217135 | 2/2002 |
| WO | 03056405 | 7/2003 |
| WO | 03061285 | 7/2003 |

* cited by examiner

*Primary Examiner* — Sathyanarayan Pannala
*Assistant Examiner* — Yuk Ting Choi
(74) *Attorney, Agent, or Firm* — The Webb Law Firm

(57) ABSTRACT

Disclosed herein is a system for providing lyrics for a plurality of digital audio files. The system includes at least one terminal, a server, and a database server. The terminal selects a digital audio file among the digital audio files, and transmits tag information to receive lyrical data assigned to the selected digital audio file. The server retrieves the lyrical data, which is assigned to the selected digital audio file, using the tag information on the digital audio file transmitted from the terminal, and transmits the lyrical data to the terminal. The database server transmits the lyrical data in response to a request from the server and previously stores lyrical data in which lyrics are synchronized with digital audio files.

15 Claims, 5 Drawing Sheets

[Fig. 1]
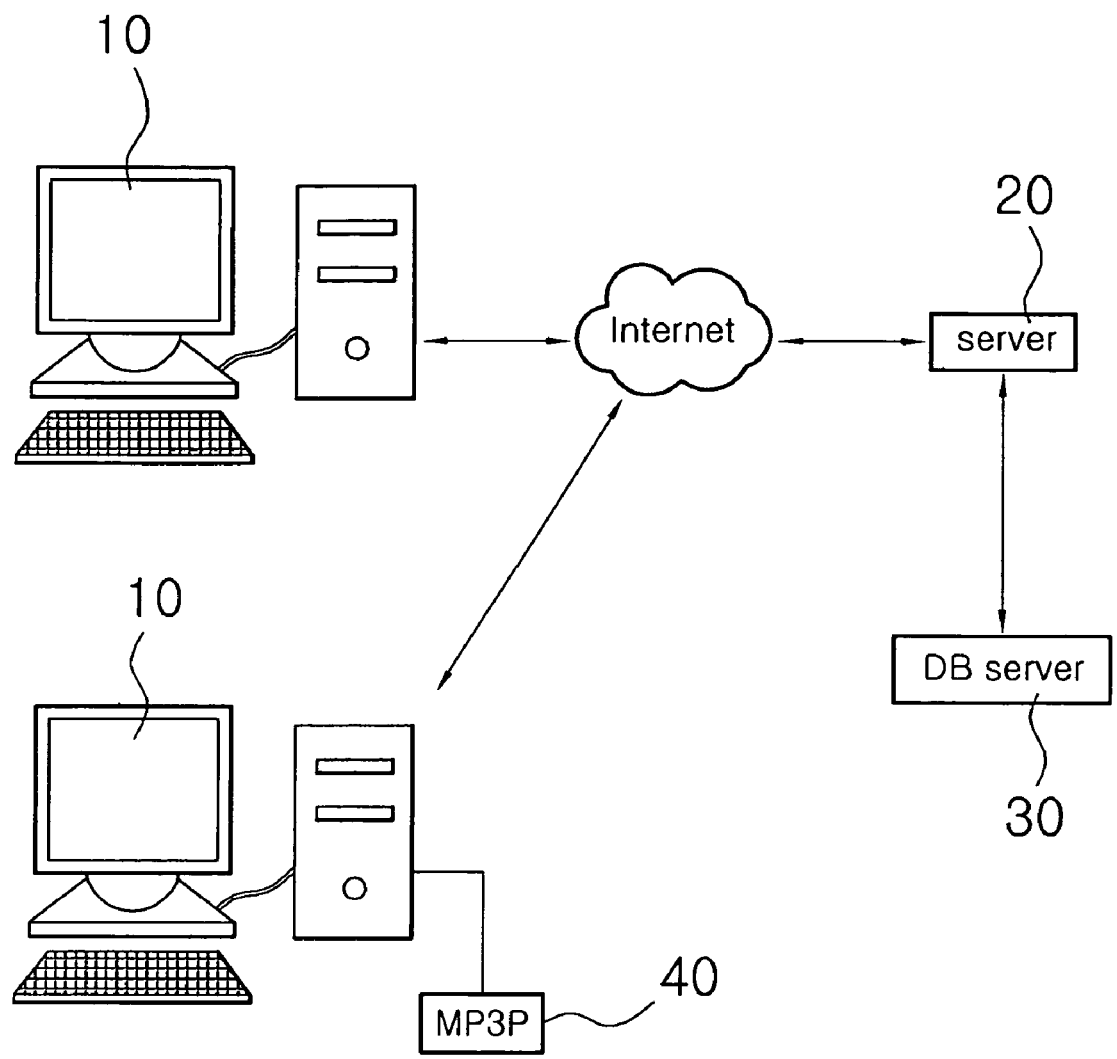

[Fig. 2]
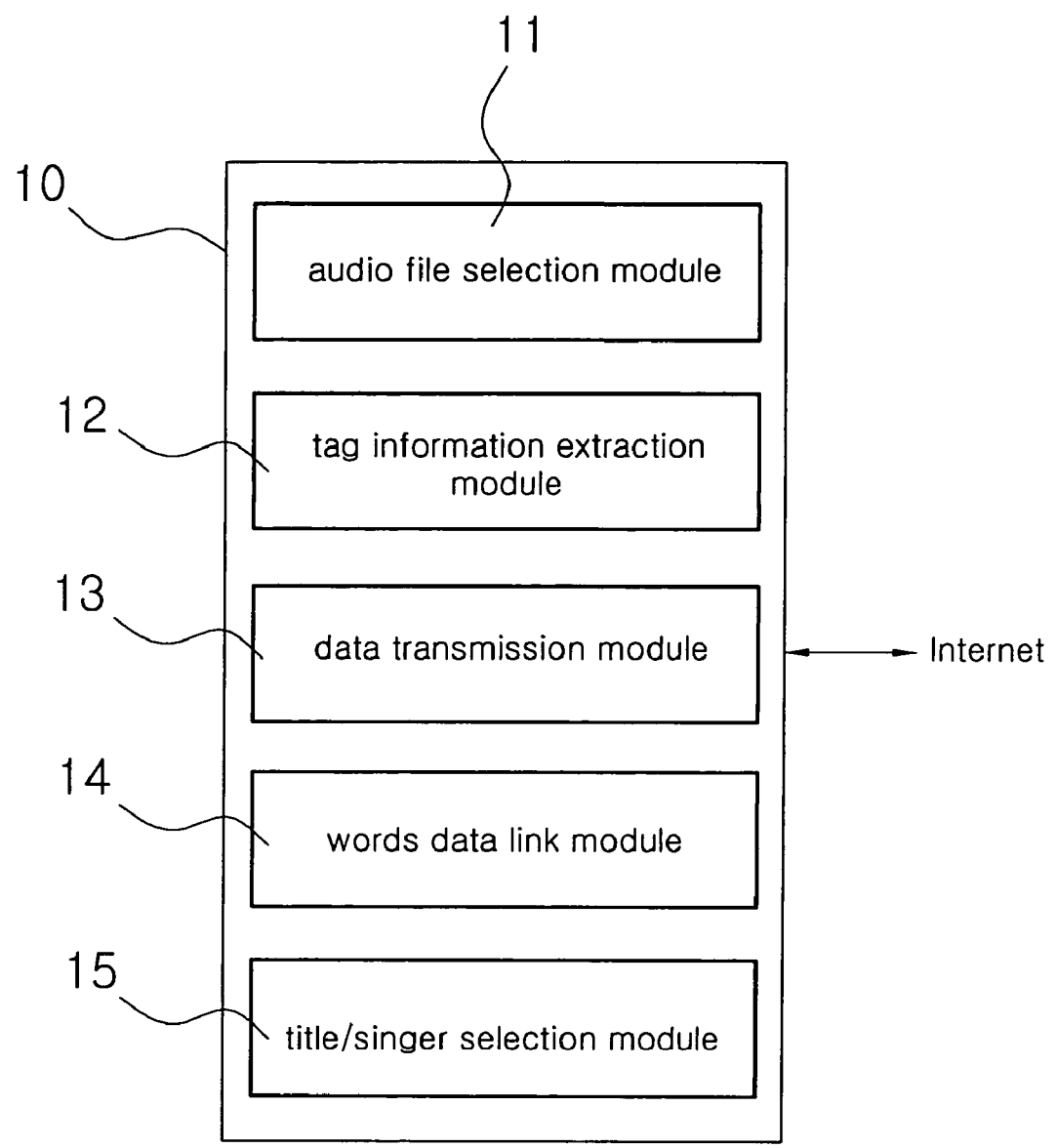

[Fig. 3]
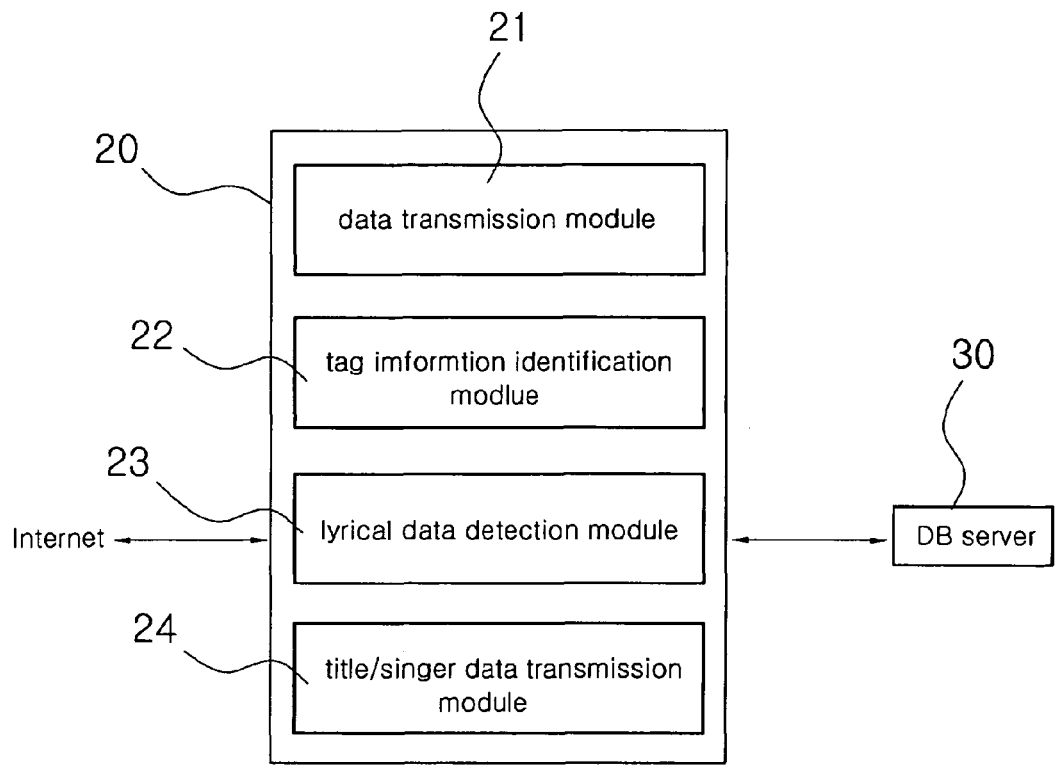
[Fig. 4]
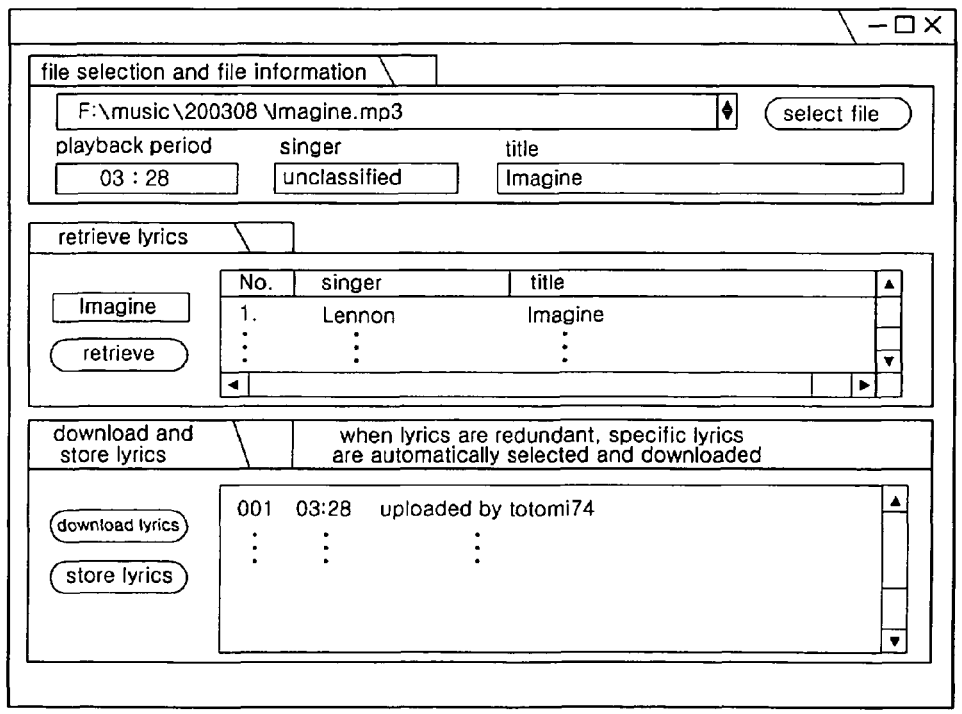

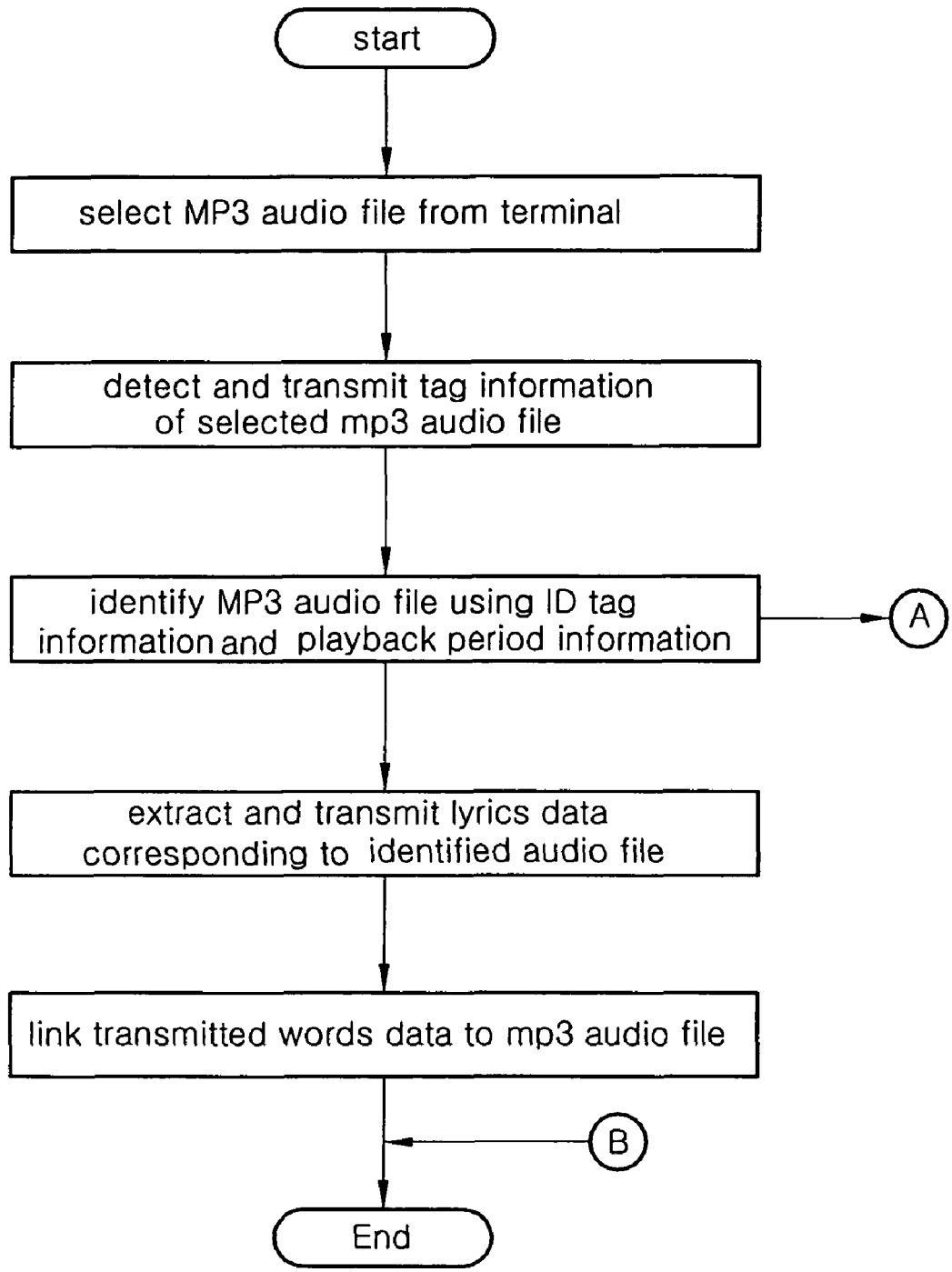
[Fig. 5]

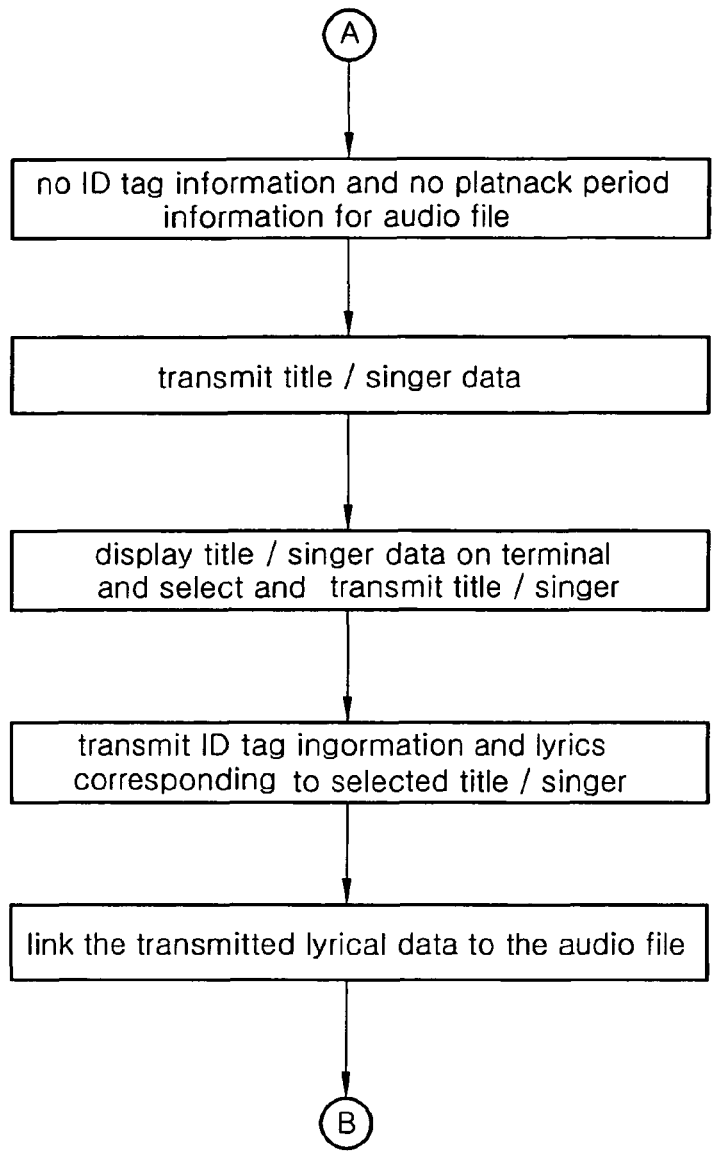
[Fig. 6]
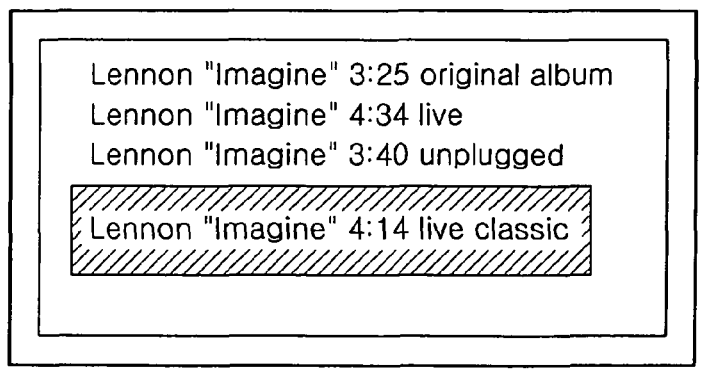
[Fig. 7]

SYSTEM FOR PROVIDING LYRICS FOR DIGITAL AUDIO FILES

FIELD OF THE INVENTION

The present invention relates to a system for providing lyrics for digital audio (music) files and, more particularly, to a system for providing lyrical data which are synchronized exactly with the corresponding digital audio (music) files to have the same reproducing time periods.

DESCRIPTION OF RELATED ART

With the development of digital technology, it has become easy to extract audio files from a typical audio Compact Disk (CD) and convert the audio files into distal audio fees such as MPEG-1 Audio Layer-3 (MP3) files, RealMedia (RM) files and Windows Media Audio (WMA) files (hereinafter collectively referred to as 'MP3 files'). Such MP3 files can be easily downloaded or uploaded through a communications network.

Since the digital audio files occupy a smaller amount of storage space, they are advantageous in that they allow a large number of songs to be stored in a CD compared to the conventional audio CD. Furthermore, storage media, such as a memory stick using flash memory is widely adopted in MP3 players. With these reasons, MP3 players are rapidly replacing conventional audio CD players.

Unlike the audio CD, digital audio files, such as MP3 files, are advantageous in that lyrics can be displayed on the display window of the MP3 player as the MP3 files are being reproduced. Namely, by having the corresponding lyrics included in the MP3 files, the lyrics can be displayed on the window of the MP3 player to correspond to the song simultaneously.

Under the conventional digital audio files, to link lyrics to a MP3 audio files, firstly, lyrics and a dedicated program (editor) for inputting of the lyrics are prepared, secondly, the MP3 file is opened on the dedicated program, thirdly, the lyrics are synchronized with the song tempo of the MP3 file while the opened MP3 audio file is being reproduced, fourthly, the synchronized lyrics are stored as a file (hereafter referred to as 'lyrical data') and fifthly, the stored file is copied to the MP3 player. As a result, the corresponding lyrics can be displayed on an LCD window while the MP3 audio file is being reproduced.

However, since the above-described linking method requires a process of linking every MP3 audio files with the corresponding lyrics respectively, it is difficult for general people to carry out the process.

SUMMARY OF THE INVENTION

In order to overcome the above-mentioned problem, a service for providing lyrical data corresponding the MP3 audio file has been provided. In the service, the lyrical data are provided through the Internet to be linked to the corresponding MP3 audio file.

However, the service described above has not considered the reproducing time periods of the concerned song, and therefore, the lyric data may not be matched with the song, especially in case that the same song was sung by different singer, of even if sung by the same singer, the occasions of the performance are different, for example, sung for recording album, or sung on a live, etc.

FIG. 7 is an example of a list of MP3 audio files having the same song title 'Imagine,' which have different reproducing time periods. Even though the same singer (i.e., Lennon) sang the same song, the reproduction time periods may differ depending on various occasions. In that case, the lyrics that are adjusted to a specific song (for example, performed for recording album) may not match other songs (for example, performed on a live) even though the same singer would sing the same song.

BRIEF DESCRIPTION OF THE DRAWINGS

FIG. 1 is a schematic configuration diagram showing a system providing lyrics for digital audio files in accordance with the present invention;

FIG. 2 is a block diagram of a terminal in accordance with the present invention;

FIG. 3 is a block diagram of a server in accordance with the present invention;

FIG. 4 is a diagram showing a digital audio file section screen in accordance with the present invention;

FIG. 5 is a flowchart showing the operation of the system for providing lyrics for digital audio fees in accordance with the present invention;

FIG. 6 is a flowchart showing the additional operation of the system for providing lyrics for digital audio files in accordance the present invention; and FIG. 7 is a diagram showing en example of a list of song titles for the same title/singer.

DESCRIPTION OF THE PREFERRED EMBODIMENTS

Accordingly, the present invention has been made keeping in mind the above-mentioned problems occurring in the prior art, and provides a system for providing lyrical data that are synchronized respectively with the corresponding digital audio files to have the same reproducing time periods.

In order to accomplish the above object, the present invention provides asystem for providing lyrics for a plurality of digital audio files, including at least one terminal for selecting a digital audio file among the digital audio files and transmitting tag information to receive lyrical data assigned to the selected digital audio file; a server for retrieving the lyrical data which is assigned to the selected digital audio file by using the tag information of the digital audio file transmitted from the terminal, and transmitting the lyrical data to the terminal; and a DB server for transmitting the lyrical data in response to a request from the server and previously storing lyrical data which are synchronized with digital audio files. In the present invention, the tag information includes a file number and the reproducing time periods.

According to the present invention, lyrical data which are precisely synchronized with the each corresponding digital audio files can be provided for the digital audio file.

Reference should now be made to the drawings, in which the same reference numerals are used throughout the different drawings to designate the same or similar components.

FIG. 1 is a schematic configuration diagram showing a system for providing lyrical data for digital audio files in accordance with the present invention. As shown in FIG. 1, one or more terminals 10 and 10' are connected to a server 20 through the Internet, and the server 20 is connected to a DataBase (DB) server 30. For convenience of description, the case where only one terminal 10 is used and where MP3 files are used as digital audio files is taken as an example.

Through the terminal 10, a user can select an MP3 digital file, and transmit the tag information thereof to the server 20 to download lyrical data assigned to the selected MP3 digital audio file. When the requested lyrical data is received from the server 20, the terminal 10 functions to link the received lyrical data to the selected MP3 audio file. The tag information of the MP3 file to be transmitted to the server 20 is extracted from the selected MP3 audio file.

The tag information according to the present invention includes identification (ID) tag information,' a 'file name' and 'playback period information.' It is apparent that the tag information can further include some other information. The ID tag information refers to information of the corresponding MP3 file, such as the information on the song title, singer, the release date of the album from which the MP3 file was extracted and genre of the song, and so on. The ID tag information can be input by an operator in off-line mode.

An MP3 file that has previously been stored in the terminal 10 or an MP3 player 40 connected to the terminal 10' can be used as the MP3 file. In particular, the MP3 player 40 is connected to the terminal 10' via a Universe Serial Bus (USB) port or a serial port or an Institute of Electrical or Electronics Engineers (IEEE) 1394 port or wireless communication such as Bluetooth communication, through which both the information data on the MP3 audio file stored in the MP3 player 40 and the lyrical data are transmitted. The MP3 player 40 can be directly connected to the server 20 through the Internet In accordance with the present invention, the MP3 file may not be an MP3 file that exists in the terminal 10 or MP3 player 40, but be an MP3 file that exists in some other computer or server connected through the Internet In this case, when the MP3 files stored in the some other computer or server is selected and its lyrical data is requested, the MP3 file and its lyrical data are transmitted to the terminal 10 or the MP3 player 40 (via the terminal 10') and are linked with each other.

The terminal 10 of the present invention may be replaced with any device capable of playing back MP3 digit audio files (for example, a cellular phone, a Personal Digital Assistant (PDA) or a PC) that is connected to Internet via wireless and/or wire line network.

As shown in FIG. 2, the terminal 10 includes an audio selection module 11 for selecting a MP3 file, the lyrics of which will be desired to be transmitted, among MP3 files that have been stored in the terminal 10 or the MP3 player 40; a tag information extraction module 12 for extracting tag information from the MP3 file selected by the audio file selection module 11; a data transmission module 13 for transmitting the tag information which is extracted by the tag information extraction module 12, through the Internet to the server 20 and for receiving lyrical data from the server 20; and a lyrical data link module 14 for linking the lyrical data, which is received from the server 20 with the selected digital audio file.

The server 20 of the present invention retrieves the lyrical data assigned to the selected MP3 file on the basis of the tag information transmitted from the terminal 10, and transmits the lyrical data to the terminal 10.

Since the server 20 uses the reproducing time period information together with the ID tag information previously included in the audio file to retrieve the lyrical data suitable for the selected MP3 file, the lyrical data that is exactly synchronized with the voice of the singer can be obtained. The lyrical data file retrieved as described above is transmitted to the terminal 10 by which the lyrical data file is requested.

As shown in FIG. 3, the server 20 includes a data transmission module 21 for receiving the tag information from the terminal 10 and transmitting the lyrical data to the terminal 10; a tag information identification module 22 for reading the tag information received from the data transmission module 21; and a lyrical data detection module 23 for requesting the retrieval of the lyrical data assigned to the MP3 file identified by the tag information identification module 22.

Meanwhile, in response to a request from the server 20, the DB server 30 extracts a corresponding lyrical data file among all the lyrical data files stored therein, and transmits the lyrical data file to the server 20. Each of the lyrical data files stored in the DB server 30 is the lyrical data file that has been previously synchronized with the corresponding MP3 files respectively according to the ID tag information, file name and reproducing time period information of the MP3 files.

The operation of the system for providing lyrical for digital audio files in accordance with the present invention is described with reference to FIGS. 4 to 7 below.

A user can selects an MP3 file in the terminal 10. An example of a screen for selection is shown in FIG. 4. Referring to FIG. 4, an MP3 file having the file name of 'Imagine.mp3' is displayed. Information about the MP3 file, such as a reproducing time period, a singer and a song title, is also displayed along with the file name of the MP3 file. When the button 'SELECT FILE' shown on the right upper portion of FIG. 4 is pressed after the MP3 audio file has been selected, the selection procedure of the corresponding MP3 file is completed.

'RETRIEVE LYRICS' and 'DOWNLOAD AND STORE LYRICS' menu items are used to receive the title/singer data from the server 20 and display the information when there is no information on an MP3 file selected by the user. Such menu items may allow the user to easily select and download the lyrical data, the detailed description of which will be made in conjunction with the title/singer selection module 15.

As described above, when the MP3 audio file is selected in the terminal 10 and a transmission instruction is input, the terminal 10 detects and transmits the tag information of the selected MP3 file to the server 20 as shown in FIG. 5. The server 20 identifies the MP3 audio file on the basis of the tag information that comprises the ID tag information, the file name (the title) and the reproducing time period information.

After identifying the MP3 audio file, the sever 20 retrieves the lyrical data suitable for the MP3 file from the DB server 30 by comparing the ID tag information, the file name and the playback period information of the MP3 file with those of the lyrical data file stored in the DB server 30. And then, the DB sever 30 transmits the retrieved lyrical data to the server 20. The process for retrieving the lyrical data corresponding to the MP3 file can be carried out by the DB server 30.

All pieces of lyrical data have been previously edited and assigned to respective MP3 audio files. The work for editing is carried out by the operator in off-line mode. All pieces of lyrical data edited for MP3 files are classified and stored in the DB server 30.

When the lyrical data is transmitted from the DB server 30, the server 20 transmits the lyrical data to the terminal 10. The terminal 10 receives and stores the lyrical data, and then links each piece of lyrical data to the corresponding MP3 file. Such a linking process allows the lyrics to be displayed through a display window during the playback of the MP3 audio file. The linked lyrical data is simultaneously transmitted along with its corresponding MP3 file when the MP3 file is transmitted to another computer or the MP3 player 40.

Meanwhile, in the cases where ID tag information is not included in the tag information transmitted from the terminal 10, or where ID tag information is not sufficient, the server 20 cannot exactly identify the MP3 audio file, as shown in FIG. 6. In such cases, the server 20 transmits to the terminal 10 the title/singer data comprising a list of song titles/singers similar to the song title of the MP3 file selected by the user in the terminal 10. The transmission of the title/singer data is performed by the title/singer data transmission module 24 of the server 20.

The list of titles/singers transmitted as described above is shown in FIG. 4. A user can select from the list of titles/singers an item (title/singer data) suitable for the MP3 file, and transmit the item (title/singer data) to the server 20. For these processes, the terminal 10 further includes the title/singer selection module 15 that displays the list of titles/singers from the title/singer data transmission module 24 and that transmits the selected item (title/singer data) suitable for the MP3 file.

The server 20 receives the item (title/singer data) suitable for the MP3 file from the terminal 10 and retrieves the lyrical data corresponding to the transmitted item (title/singer data), and transmits the lyrical data to the terminal 10. At the same time, the server 20 transmits the ID tag information that may matches the item (title/singer data).

After the terminal 10 that has received the lyrical data from the server 20, user can make the transmitted ID tag information included in the MP3 audio file, and link the lyrical data to the MP3 audio file. By doing these procedures, the lyrics can be displayed on the display window while the MP3 file is being reproduced.

In the above description, the process for providing the lyrical data for the MP3 audio files stored in the user's terminal or MP3 player has been described. However, the above-described scheme can be applied to MP3 audio files provided by some other computer or server other than the use's terminal.

In that case, when an MP3 audio file stored in some other computer or server is selected on the menu item 'FILE SELECTION AND INFORMATION' shown in FIG. 4, the tag information is transmitted to the server 20 for downloading of the corresponding MP3 audio file as well as the lyrical data to the user's terminal 10.

When the transmission of the corresponding MP3 audio file and the lyrical data is completed, the terminal 10 completes the process by linking the lyrical data to the corresponding MP3 audio file.

Although in the above description, the MP3 audio files have been taken as an example, it is apparent that the method of the present invention is applicable to other digital audio files such as WMA or RM files.

In a system for providing lyrics for a plurality of digital audio files in accordance with the present invention, lyrical data, which is precisely synchronized with the lyrics of each of the digital audio files to have the same reproducing time period can be provided for the digital audio file.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A system for providing lyrics for a plurality of digital audio files, comprising:
   at least one terminal configured to select a digital audio file among digital audio files using a reproducing time period to identify a unique file, and transmitting tag information having ID tag information and the reproducing time period of the selected digital audio file, wherein the reproducing time period is the length of the digital audio file;
   a server configured to retrieve lyrical data corresponding to the digital audio file on the basis of the ID tag information and the reproducing time period transmitted from the terminal, and wherein the server is further configured to transmit the retrieved lyrical data to the terminal, and wherein the lyrical data is identified from at least two lyrical data files related to different digital audio files having in common at least a portion of ID tag information; and
   a database (DB) server configured to store lyrical data previously synchronized with the corresponding digital audio files and classified by the ID tag information and the reproducing time period of the digital audio files, and wherein the database server is further configured to transmit such lyrical data in response to a request from the server.

2. The system as set forth in claim 1, wherein the terminal comprises:
   an audio selection module for selecting the digital audio file among the digital audio files;
   a tag information extraction module for extracting tag information from the selected digital audio file;
   a data transmission module for transmitting the extracted tag information to the server, and receiving the lyrical data from the server; and a lyrical data link module for linking the received lyrical data with the selected digital audio file.

3. The system as set forth in claim 1, wherein the server comprises:
   a data transmission module for receiving the tag information from the terminal and for transmitting the lyrical data to the terminal;
   a tag information identification module for reading the tag information received at the data transmission module; and
   a lyrical data detection module for retrieving the lyrical data corresponding to the read tag information from the DB server.

4. The system as set forth in claim 1, wherein:
   the server further comprises a data transmission module configured to transmit title and singer data to the terminal when there is insufficient ID tag information in the tag information transmitted from the terminal; and
   the terminal further comprises a selection module configured to allow a user to select a title and singer from the title and singer data received from the server and transmit the information on the title and singer to the server.

5. The system as set forth in claim 1, wherein the terminal is connected to an MP3 player so that a user can select a digital audio file stored in the MP3 player, wherein the terminal is configured to transmit to the MP3 player the lyrical data received from the server.

6. The system as set forth in claim 5, wherein the MP3 player is connected to the terminal via one of a Universal Serial Bus (USB) port, a serial port, an IEEE 1394 port, and a wireless connection.

7. The system as set forth in claim 1, wherein the terminal is configured to select a digital audio file stored in one of another computer and another server connected through the Internet, and wherein the terminal is configured to transmit the corresponding lyrical data to one of the another computer and the another server.

8. The system as set forth in claim 2, wherein the terminal is connected to an MP3 player so that a user can select a digital audio file stored in the MP3 player, wherein the terminal is configured to transmit to the MP3 player the lyrical data received from the server.

9. The system as set forth in claim 3, wherein the terminal is connected to an MP3 player so that a user can select a digital audio file stored in the MP3 player, wherein the terminal is configured to transmit to the MP3 layer the lyrical data received from the server.

10. The system as set forth in claim 4, wherein the terminal is connected to an MP3 player so that a user can select a digital audio file stored in the MP3 player, wherein the terminal is configured to transmit the MP3 player the lyrical data received from the server.

11. The system as set forth in claim 1, wherein the length of the digital audio file is represented in minutes and seconds.

12. A system for providing lyrics for a plurality of digital audio files, comprising: at least one terminal configured to select a digital audio file among digital audio files using a reproducing time period to identify a unique file, and transmitting tag information having ID tag information and the reproducing time period of the selected digital audio file, wherein the reproducing time period is the length of the digital audio file; a server configured to retrieve lyrical data corresponding to the digital audio file on the basis of the ID tag information and the reproducing time period transmitted from the terminal, wherein the server is further configured to transmit the retrieved lyrical data to the terminal, and wherein the lyrical data is distinguished from other lyrical data associated with at least one other digital audio file having in common at least a portion of the tag information associated with the digital audio file; and a database (DB) server configured to store lyrical data previously synchronized with the corresponding digital audio files and classified by the ID tag information and the reproducing time period of the digital audio files, and wherein the database server is further configured to transmit such lyrical data in response to a request from the server.

13. The system as set forth in claim 12, wherein the at least one terminal further comprises:

an audio selection module for selecting the digital audio file among the digital audio files;

a tag information extraction module for extracting tag information from the selected digital audio file;

a data transmission module for transmitting the extracted tag information to the server, and receiving the lyrical data from the server; and a lyrical data link module for linking the received lyrical data with the selected digital audio file.

14. The system as set forth in claim 12, wherein the server further comprises:

a data transmission module for receiving the tag information from the at least one terminal and for transmitting the lyrical data to the at least one terminal;

a tag information identification module for reading the tag information received at the data transmission module; and a lyrical data detection module for retrieving the lyrical data corresponding to the read tag information from the DB server.

15. The system as set forth in claim 12, wherein:

the server further comprises a data transmission module configured to transmit title and singer data to the at least one terminal when there is insufficient ID tag information in the tag information transmitted from the at least one terminal; and the at least one terminal further comprises a selection module configured to allow a user to select a title and singer from the title and singer data received from the server and transmit the information on the title and singer to the server.

* * * * *

UNITED STATES PATENT AND TRADEMARK OFFICE
CERTIFICATE OF CORRECTION

| | | |
|---|---|---|
| PATENT NO. | : 8,190,606 B2 | Page 1 of 1 |
| APPLICATION NO. | : 10/580360 | |
| DATED | : May 29, 2012 | |
| INVENTOR(S) | : Myung Gu Kim et al. | |

It is certified that error appears in the above-identified patent and that said Letters Patent is hereby corrected as shown below:

Title Page of the Patent, Column 1, Item (73) Assignees, Line 2, delete "Zwinjnaarde" and insert -- Zwijnaarde --

Signed and Sealed this
Twenty-fifth Day of September, 2012

David J. Kappos
*Director of the United States Patent and Trademark Office*